Patented June 16, 1953

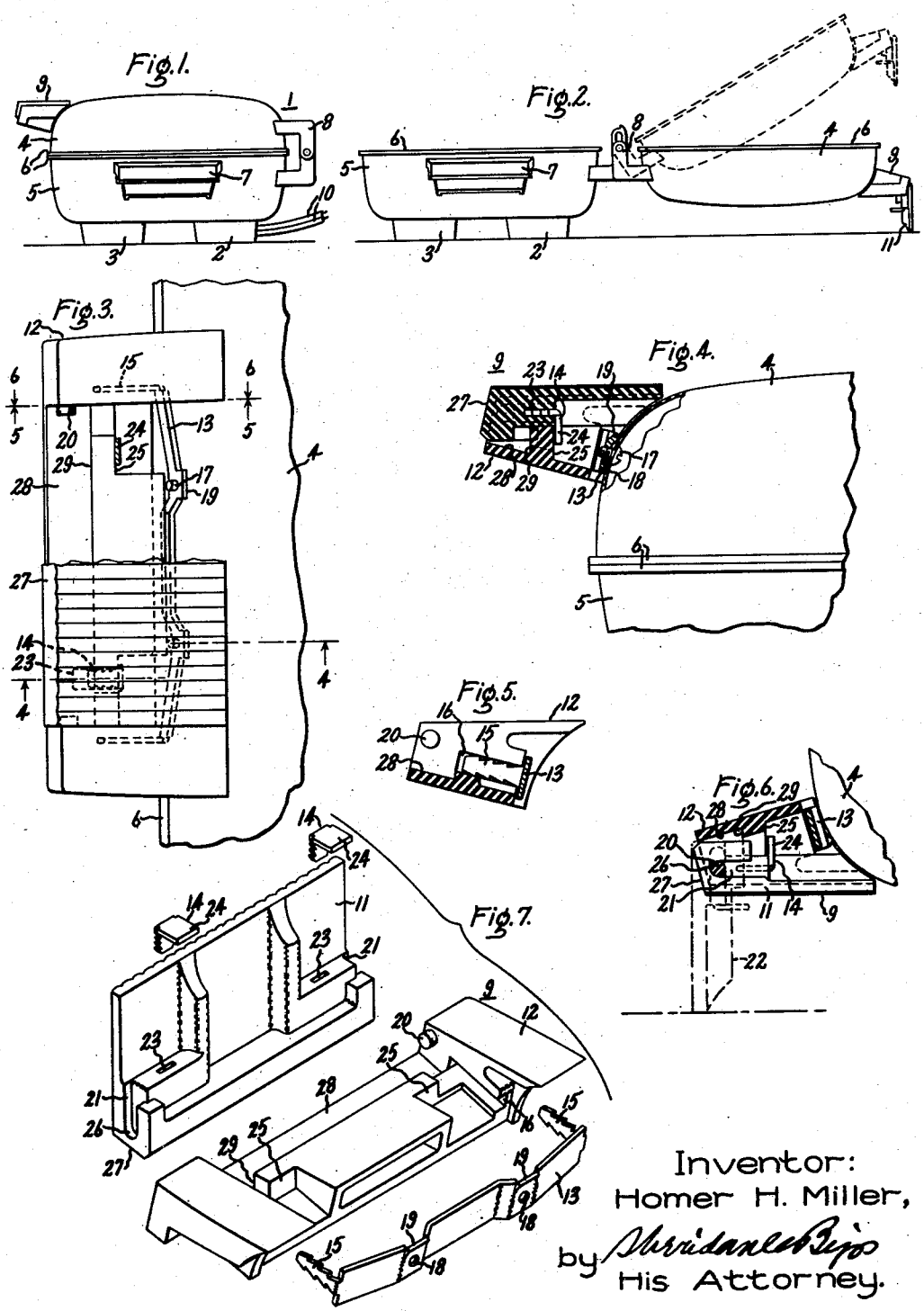

2,641,994

UNITED STATES PATENT OFFICE 2,641,994

COMBINED HANDLE AND SUPPORT

Homer H. Miller, Bridgeport, Conn., assignor to General Electric Company, a corporation of New York Application February 11, 1950, Serial No. 143,729

1 Claim. (Cl. 99—340)

This invention relates to a combined handle and support for an electric appliance and, more particularly, to such a handle and support which is useful with an electric heating appliance such as a sandwich grill or waffle iron.

In electric waffle irons and sandwich grills where two heated cooking surfaces are provided, which normally simultaneously heat two sides of the food being cooked, it is often convenient, particularly with sandwich grills, to use both cooking surfaces of the appliance as single surface cookers. With the conventional sandwich grill construction, this means that the upper heating unit which normally transmits heat downwardly must be opened up approximately 180° to transmit heat upwardly. In this latter position, the upper heating unit, to be useful, must be supported in a horizontal position. The usual hinged connection to the lower unit will support one side of this upper unit, but a downwardly-extending support member is required at the other side. If this support member is continuously extended, it provides an awkward and unbecoming appearance when the device is closed for normal use or storage. A handle must also be provided at the outer edge of the upper unit for conveniently raising and lowering this unit for inserting and removing food from the appliance.

It is, therefore, an object of this invention to provide a combined handle and support for an electric appliance in which a support element forms a decorative portion of the handle.

The invention, therefore, consists generally in a combined handle and support including a rigid handle portion fixedly mounted to the upper hinged section of an electric appliance and a support portion hingedly mounted to automatically open to a downwardly-extending supporting position when the upper hinged section of the appliance is opened approximately 180°.

For a better understanding of this invention, reference should be had to the following specification and the accompanying drawing in which Fig. 1 is a side view of a sandwich grill incorporating the combined handle and support of this invention; Fig. 2 is a similar view of the sandwich grill in the open position showing the support portion of the combined handle and support in the extended position; Fig. 3 is a top view of a portion of the grill showing the handle partially cut away; Fig. 4 is a side view taken through the section 4—4 in Fig. 3; Fig. 5 is a side view of the handle alone taken through the section 5—5 in Fig. 3; Fig. 6 is a side view of the handle in the inverted position taken through the section 6—6 in Fig. 3 and showing the support portion of the handle in phantom and extended as in Fig. 2; and Fig. 7 is an exploded view of the components of the handle.

Referring more particularly to Fig. 1, there is shown an electrical sandwich grill 1 having supports 2 and 3 and including an upper section 4 and a lower section 5 having grids 6 between which the food to be cooked may be placed. A handle 7 and its counterpart in an opposite position on the other side of the grill are provided for lifting and moving the appliance. The upper section 4 is hingedly mounted on the lower section 5 by means of hinges 8. Handle 9 is provided for opening the device by raising upper section 4, and lead-in conductors 10 are provided which enter the device through support 2. The structure of support 2 forms the subject of my concurrently filed co-pending patent application, Serial No. 143,727, and other features of the structure of this heating device form the subject of my concurrently filed co-pending patent application, Serial No. 143,728. Both of these applications are assigned to the General Electric Company, assignee of the present invention, and have issued as Patents 2,544,343 and 2,588,145, respectively. The present invention is concerned primarily with the structure of handle 9 which, by means of a support portion 11, which extends outwardly and downwardly, as the upper section of the device is opened, to support the outer portion of the upper section in the completely opened position. This position of the sandwich grill is shown in Fig. 2 with the support portion 11 of handle 9 extended. This opening action of the hinged support portion 11 is automatic since the support portion 11 swings out by the force of gravity. This action is shown in Fig. 2 by a phantom view of upper section 4 in an intermediate position of the opening.

The structural details of handle 9 may best be understood by reference first to the exploded view of Fig. 7 where the handle is shown to consist of a body portion 12, a mounting bracket 13, the support section 11, and L-shaped retaining barbs 14. Mounting bracket 13 is assembled to body portion 12 by means of the barbed prongs 15 on the bracket which are inserted into slots 16 in the body portion, only one of which is visible in Fig. 7. These parts are shown in assembled relationship in Fig. 5. The handle is mounted, as best shown in Fig. 4, by means of threaded fastenings 17 which extend through suitable holes in the shell of the upper section 4 of the sandwich grill into threaded engagement with the holes at 18 on bracket 13. Above each of the holes 18 is an outwardly bent tongue 19 which serves to position the handle at the proper angle when in the assembled position with relation to section 4 as shown in Fig. 4.

Support portion 11 is hingedly mounted on the body portion 12 by means of small hinge buttons 20 on body portion 12 which, in the assembled position, fit into slots 21 in support portion 11. This assembled position may be obtained by rotating support portion clockwise 90° from the position shown in Fig. 7 and moving it towards the body portion 12 so that slots 21 slide over buttons 20. This assembled position is shown in Figs. 3, 4, and 6. The support portion may then be rotated back 90° in the clockwise direction, hinged about hinge buttons 20 into a position corresponding to the phantom view shown at 22 in Fig. 6. Barbs 14 may then be inserted in slots 23 in support portion 11. The assembled position of the barbs is shown in Figs. 4 and 6. The purpose of the barbs is also best shown in Figs. 4 and 6 where it can be seen that the downwardly-extending portions 24 of the barbs engage with the shoulders 25 of body portion 12 to prevent disassembly of the support portion 11 from body portion 12.

In the closed position of the sandwich grill shown in Fig. 1, support portion 11 will normally remain in the closed position shown in Figs. 1, 3, and 4 as a decorative portion of handle 9. As mentioned above, when the upper section 4 of the sandwich grill is opened as in Fig. 2, the support portion 11 automatically hinges outwardly and downwardly under the force of gravity. At this time, since the support portion is hanging from the body portion 12 by means of hinge buttons 20, the hinge buttons 20 will be associated with the ends of slots 21 indicated at 26 in Fig. 7. In this position of support member 11 with respect to body member 12, a clearance space is maintained between the beveled front surface 27 of support member 11 and the beveled inner surface 28 of body member 12. These surfaces are indicated in Figs. 4, 6, and 7. However, when the upper section of the sandwich grill approaches the fully opened position shown in Fig. 2, the lower edge of support portion 11 meets the supporting surface to prevent further downward movement of the support portion, but the upper section 4 and the handle body member 12 continue to move until surfaces 27 and 28 are engaged. This position is shown by the phantom view of support section 11 at 22 in Fig. 6. The end of support portion 11, including surface 27, is fitted into a notch in body portion 12 including the surface 28 and a surface 29 which are best shown in Fig. 4. Because of the angles of the surfaces of this notch, when the weight of upper section 4 is supported upon the handle, the support section 11 is restrained against rotation in either direction so as to prevent collapse of the support.

It will be seen from the above description that this invention provides an improved, combined handle and support for the hinged portion of an electrical cooking appliance, such as a sandwich grill or a waffle iron, which is characterized by economy, simplicity, dependability, and attractive appearance.

While I have shown and described particular embodiments of my invention, it will be obvious to those skilled in the art that various changes and modifications may be made without departing from my invention in its broader aspects and I, therefore, aim in the appended claim to cover all such changes and modifications as fall within the true spirit and scope of my invention.

What I claim as new and desire to secure by Letters Patent of the United States is:

In an electrical appliance of the type including a stationary base section and a cover section having a hinged connection therewith, a combined handle and support attached to an outer edge of said cover remote from the hinged connection to said base section, said handle comprising a body portion of a heat insulating material, a metal bracket for mounting said body portion to said cover and attached to said body portion by means of barbed tongues extending into slots in said body portion, a support portion having pivotal connection means with said body portion for rotation about an axis parallel to the axis of rotation of said cover with respect to said base section and remote from said mounting bracket, means limiting rotation of said support portion with respect to said body portion to a range between a retracted position parallel to the plane of said cover and an extended position perpendicular to the plane of said cover, the pivotal connection means for said support portion with respect to said body portion including hinge buttons on one of said portions which extend into slotted depressions on the other of said portions, said slotted depressions being closed at one end and open at the opposite end to facilitate assembly of said support portions, shoulders on said body portion adjacent said pivotal connection means, L-shaped barbs assembled in slots in said support portion for respectively engaging said shoulders on said body portion for preventing disengagement of said hinge buttons and said slotted depressions when said support portion is parallel to the plane of said cover, a bevelled surface on the hinged end of said support portion, a depression in said body portion for receiving said hinged end of said support portion and including a bevelled surface to cooperate with said bevelled surface on said support member, said pivotal connection means providing an appreciable lost motion displacement between said body portion and said support portion to allow close engagement of said bevelled surfaces when said support portion is in the extended position to prevent collapse of said support portion into the retracted position when said cover is being supported thereby.

HOMER H. MILLER.

References Cited in the file of this patent

UNITED STATES PATENTS

| Number | Name | Date |
|---|---|---|
| 1,450,277 | Brown et al. | Apr. 3, 1923 |
| 1,661,294 | Lemaster | Mar. 6, 1928 |
| 2,009,792 | Uhl | July 30, 1935 |
| 2,146,172 | Burch | Feb. 7, 1939 |
| 2,361,285 | Gough | Oct. 24, 1944 |